United States Patent [19]

Takagi

[11] Patent Number: 5,598,243

[45] Date of Patent: Jan. 28, 1997

[54] CAMERA HAVING REMOVABLE VIEWFINDER AND VISUAL LINE DETECTION DEVICE

[75] Inventor: Tadao Takagi, Yokohama, Japan

[73] Assignee: Nikon Corporation, Tokyo, Japan

[21] Appl. No.: 251,294

[22] Filed: May 31, 1994

[30] Foreign Application Priority Data

May 31, 1993 [JP] Japan ................................. 5-129207

[51] Int. Cl.⁶ .................................................. G03B 13/02
[52] U.S. Cl. ................................................ 396/51; 396/373
[58] Field of Search ..................................... 354/410, 219, 354/62

[56] References Cited

U.S. PATENT DOCUMENTS

| | | | |
|---|---|---|---|
| 4,574,314 | 3/1986 | Weinblatt | 354/400 X |
| 4,836,670 | 6/1989 | Hutchinson | 354/62 X |
| 4,950,069 | 8/1990 | Hutchinson | 354/62 X |
| 5,036,347 | 7/1991 | Tsunekawa et al. | 354/62 X |
| 5,225,862 | 7/1993 | Nagano et al. | 354/410 X |
| 5,333,029 | 7/1994 | Uchiyama et al. | 354/410 |

FOREIGN PATENT DOCUMENTS 1-274736  11/1990  Japan .

*Primary Examiner*—Safet Metjahic
*Attorney, Agent, or Firm*—Oliff & Berridge

[57] ABSTRACT

In a camera having a viewfinder that is detachable from the camera body, and a visual line detection device, calibration data specific for different photographers is stored in a memory located in the detachable viewfinder. This eliminates the need to re-input the calibration data every time the viewfinder is changed. Additionally, when a classification code is stored in a memory in each camera body, the classification code being specific for each camera body, the calibration data is stored in correspondence with the classification codes in the viewfinder memory. Then, the appropriate calibration data is accessed by reading the classification code from the camera body memory then the viewfinder is attached to a camera body, and then accessing the calibration data that is stored in correspondence with that read classification code in the viewfinder memory.

28 Claims, 10 Drawing Sheets

CAMERA HAVING REMOVABLE VIEWFINDER AND VISUAL LINE DETECTION DEVICE

BACKGROUND OF THE INVENTION

1. Field of the Invention

This invention relates to a camera having a detachable viewfinder and a visual line detection device that enables the detection of the visual line of the photographer as the photographer looks through the detachable viewfinder, and that enables one to set the camera for various types of photographic conditions.

2. Description of Related Art

Japanese Laid-Open Patent Application No. 1-274736 discloses a camera having a visual line detection device. With this camera, illuminated is the eyeball of the photographer looking through the viewfinder by a light beam, and images of the photographer's eyeball and light reflected from the cornea are focused on a CCD (charge coupled device) area sensor by means of a light concentrating lens. The central position of the pupil and the incidence position of the reflected light are obtained from these images. By calculating the rotational angle of the eyeball, a determination can be made as to which region of the viewfinder and, thus, which portion of the object image the photographer is viewing.

Other documents disclosing visual line detection devices include U.S. Pat. No. 4,836,670, U.S. Pat. No. 4,950,069, U.S. Pat. No. 5,036,347 and U.S. patent application Ser. No. 08/005,829.

The size of the eyeball and its visual axis, and whether it be the naked eye, one that is fitted with a contact lens, or if glasses are worn, will vary with each photographer. Hence, when calculating the visual line of the photographer, such individual differences are often ignored, making it easy to err in the calculation of the visual line by making use of calculations that rely on average values. Hence, with the camera that is fitted with the visual line detection device disclosed in the above-identified Japanese Laid-Open Application No. 1-274736 and U.S. patent application Ser. No. 08/005,829, data relating to the eyes of the individual photographer (referred to as "calibration data") is pre-input into the camera, in order to suppress an occurrence of errors in calculations.

It is well known to use different types of viewfinders (which are interchangeable with the camera body) in single lens reflex cameras. However, when visual line detection devices also are included in single lens reflex cameras having interchangeable viewfinders, if adaptation is made for providing a memory storage device into which the calibration data are stored in the camera body, there is a loss of reliability when the viewfinder is changed. Accordingly, new values for the calibration data must again be input to the camera body after changing the viewfinder.

SUMMARY OF THE INVENTION

An object of the present invention is to provide a camera that is fitted with a visual line detection device, in which it is not necessary to re-input calibration data, even when the viewfinder has been changed.

In order to achieve the above and other objects, and to overcome the deficiencies set forth above, a correction value storage device, which stores correction values (e.g., calibration data), is provided in the detachable viewfinder of a camera. Additionally, the camera includes a detection device that detects the visual axis of the eye of a photographer who is looking at a photographic object through the viewfinder, and a correction value calculator that calculates the correction value corresponding to differences between a visual axis detected by the detection device when the photographer views a reference target and an actual viewing direction of the photographer toward the target. The calculated correction value then is stored in the correction value storage device in the detachable viewfinder. The camera also includes a visual line calculator that calculates values relating to the visual line of the photographic object based upon the detected visual axis and the correction value. The camera also includes a photographic condition establishment device that establishes photographic conditions such as, for example, a focus distance and an exposure value, based upon the values relating to the calculated visual line, and a photographic device that executes the taking of the photograph in correspondence with the release operation.

According to another aspect of the invention, the camera body includes a code storage device that stores a classification code that can be used to distinguish that camera body from other camera bodies. The correction value storage device in the detachable viewfinder stores the correction values in correspondence with the classification code of the camera body to which the viewfinder was attached when the correction values were calculated. When a viewfinder is attached to a camera body, a read-out circuit reads the classification code stored in the code storage device of the camera body, and then accesses the appropriate correction values from the correction value storage device.

The detection device, the correction value calculator, and the visual line calculator also can be provided in the viewfinder. The establishment device preferably is provided in the camera body. A transmission device is provided between the viewfinder and the camera body over which data is transmitted. The values relating to the visual line calculated in the visual line calculator of the viewfinder are transmitted to the camera body when taking a photograph. When the viewfinder is attached to the camera body, the classification code is transmitted over the transmission device. The read-out circuit then reads the correction values from the correction value storage device based on the classification code, and transmits the correction values to the visual line calculator.

According to another aspect of the invention, a determination stage ascertains the existence or non-existence of classification codes. A photographic condition establishment control device establishes the photographic conditions selected by the photographer, without the use of visual line calculation results when the determination circuit determines that no classification codes are present.

As detailed above, the correction values are read-out from the correction value storage device provided in the viewfinder, and visual line calculations are accomplished. If the viewfinder is changed, then correction values appropriate to the newly installed viewfinder are read out, and visual line calculations are performed appropriately.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

FIGS. 1–10 serve to explain one illustrative embodiment of the present invention.

Figure 2:
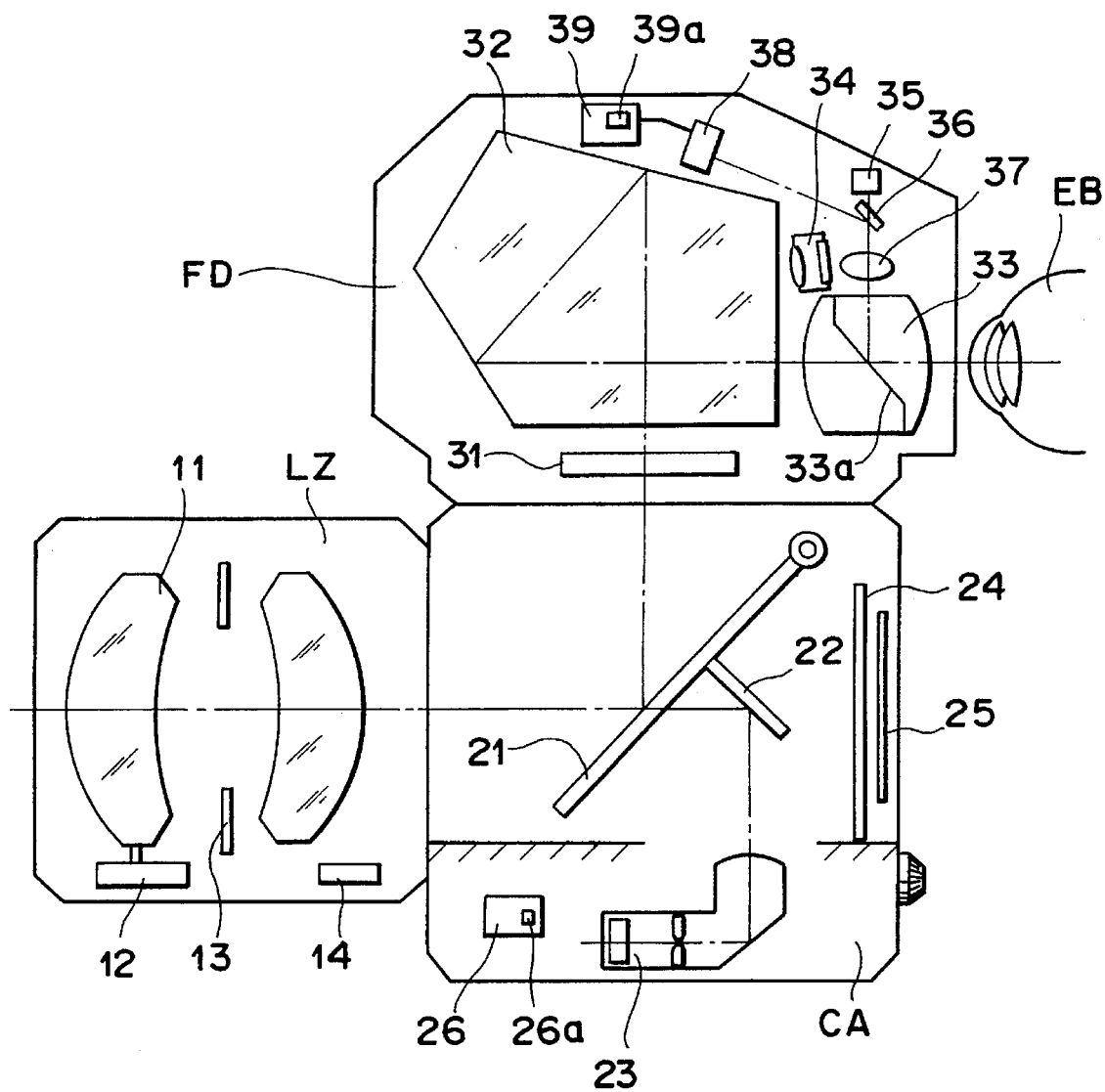
FIG. 2 is a schematic diagram that shows the general construction of a camera according to an embodiment of the present invention.

FIG. 2 is a side view showing the inner workings of a camera body CA that is fitted with an interchangeable lens LZ and an interchangeable viewfinder FD. Light rays passing through the lens 11 housed in the photographic interchangeable lens LZ are reflected upward by the quick return mirror 21 to focus onto the focal plate 31, and are reflected downward by the sub-mirror 22 to focus onto the focal point detection device 23. The projected image of the focal plate 31 passes through the object lens 33 from the pentaprism 32, and is projected into the eyeball EB of the photographer, enabling the photographer to view the object. A portion of the light rays entered into the object lens 33 are projected into the photoelectric converter 34, which is used for light measurement, by means of a well known optical system (not shown). An infrared ray emitting diode 35 that is used for visual line detection as is well known, emits a light beam that passes through the half mirror 36, the light concentrating lens 37, and the light ray allocation mechanism 33a, to illuminate the eyeball of the photographer. A photoelectric converter 38 is used for visual line detection. In particular, an image, which is reflected from the illuminated eyeball, is formed on photoelectric converter 38, enabling the detection of the visual line of the person operating the camera on the basis of a signal output from photoelectric converter 38.

Figure 1:
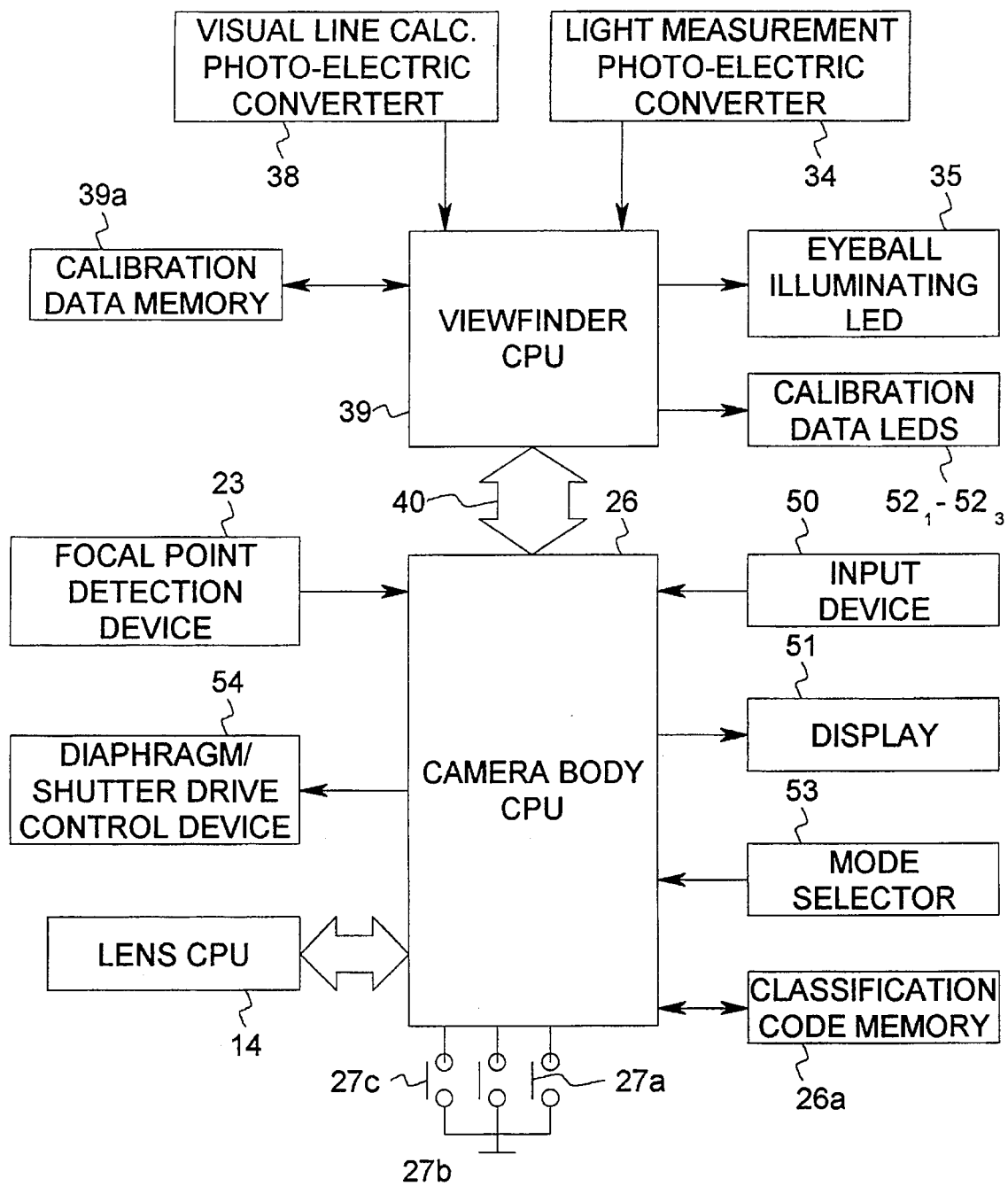
FIG. 1 is a block diagram showing a control system for a camera having a visual line detection device according to the present invention.
Figure 3:
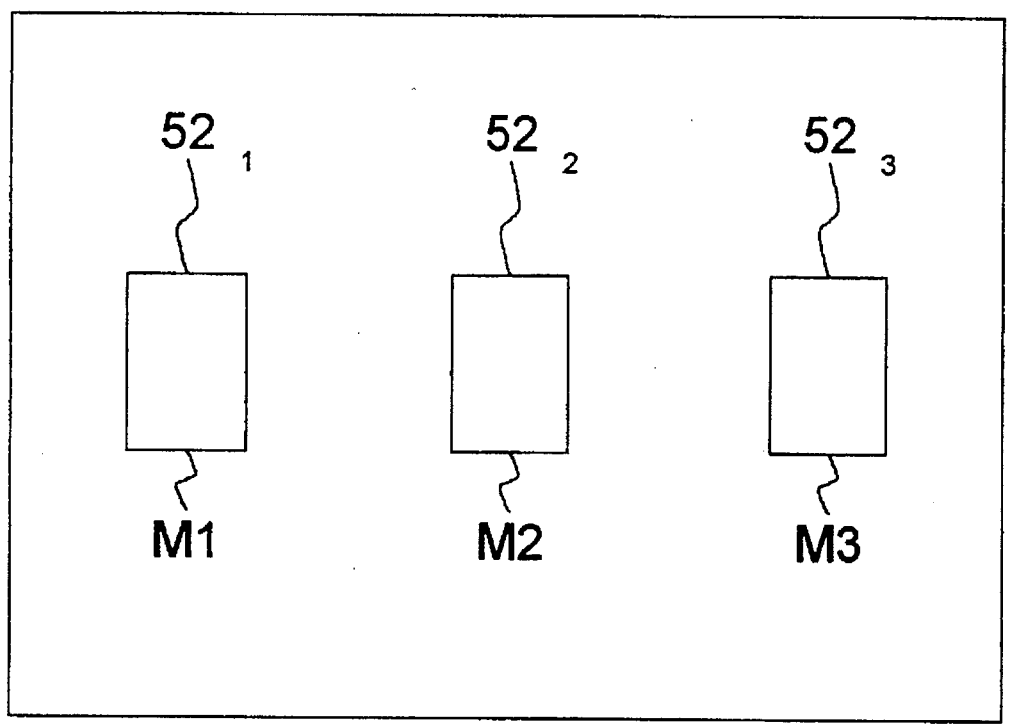
FIG. 3 shows the arrangement of various light producing marks (reference targets) within the viewfinder.

Three light emitting diodes $52_1$, $52_2$, $52_3$ as shown in FIG. 1 are provided, which flash on and off to produce three reference target marks M1–M3 as shown in FIG. 3, which are lined up horizontally. These light emitting diodes are blinked when the calibration data used for the detection of the visual line is input, as will be detailed hereafter. The light emitting diodes $52_1$–$52_3$ can be provided on the focal plate 31, for example, so that they can be viewed by the photographer through the viewfinder eyepiece during the calibration data input operation.

In FIG. 2, a CPU 26 is provided in the camera body CA. Within the memory of the CPU 26 is provided a memory region 26a that stores a classification code that is provided for each camera body in order to differentiate between the various camera bodies, as will be described hereafter. Viewfinder FD includes a viewfinder CPU 39. Within the memory of the viewfinder CPU 39 is provided a memory region 39a that houses the visual line detection calculation correction values (i.e., calibration data). As will be detailed below, preferably the correction values are recorded in correspondence with classification codes. That is, each of the classification codes can be used as an address of the memory region 39a to read out the correction values.

As shown in FIG. 2, the camera also includes a focal adjustment drive system 12 that drives (focuses) lens 11, a diaphragm 13, a lens CPU 14, a shutter 24, and film 25.

FIG. 1 is a block diagram that shows the control system of a camera having a visual line detection device in accordance with the present invention. The camera body CPU 26 and the viewfinder CPU 39 are connected, for example by a bus 40 so as to be capable of transmitting data therebetween. To the body CPU 26 are attached a liquid crystal display 51, which displays the photographic conditions and the like, the memory 26a in which the classification code is recorded, the focal point detection device 23, the half depression switch 27a, which turns on with a half depression of the release button, the full depression switch 27b, which turns on when the release button is fully depressed, the electric power switch 27c, and the lens CPU 14. An input device (terminal device) 50, such as, for example, an electronic notebook, can be detachably connected to the CPU 26 through a connector on the camera body, not shown. By means of the key input of the input device 50, a classification code for the camera body can be input to the memory 26a. The memory 26a makes use of an element, such as an EEPROM, to maintain the contents of the memory, even if the supply of electricity is cut off.

Furthermore, to the body CPU 26 are attached a mode selection operational component 53, which selects the focal point adjustment mode or the light measurement mode (both of which are well known), and the diaphragm and shutter drive control mechanism 54.

To the viewfinder CPU 39 are respectively connected the memory 39a, in which the calibration data is recorded, the photoelectric converter 34, used for light measurement, light emitting diodes 35 used to illuminate the eyeball, light emitting diodes $52_1$–$52_3$ that flash on and off to produce the reference target marks M1–M3 within the viewfinder during a calibration data input operation (described below), and photoelectric converter 38, which is used to detect the visual line. The memory 39a consists of an element, such as an EEPROM, to maintain the contents of memory, even if the supply of electricity is cut-off.

The operational principle behind visual line detection is described, for example, in Japanese Laid-Open Patent Application No. 1-274736.

With this type of camera, for example, there may be multiple regions within the photographic field, and a judgment is made from the calculated visual line as to which region the photographer is focusing on, enabling the establishment of light measurement and focal point adjustment conditions appropriate for the desired region.

Figure 4:
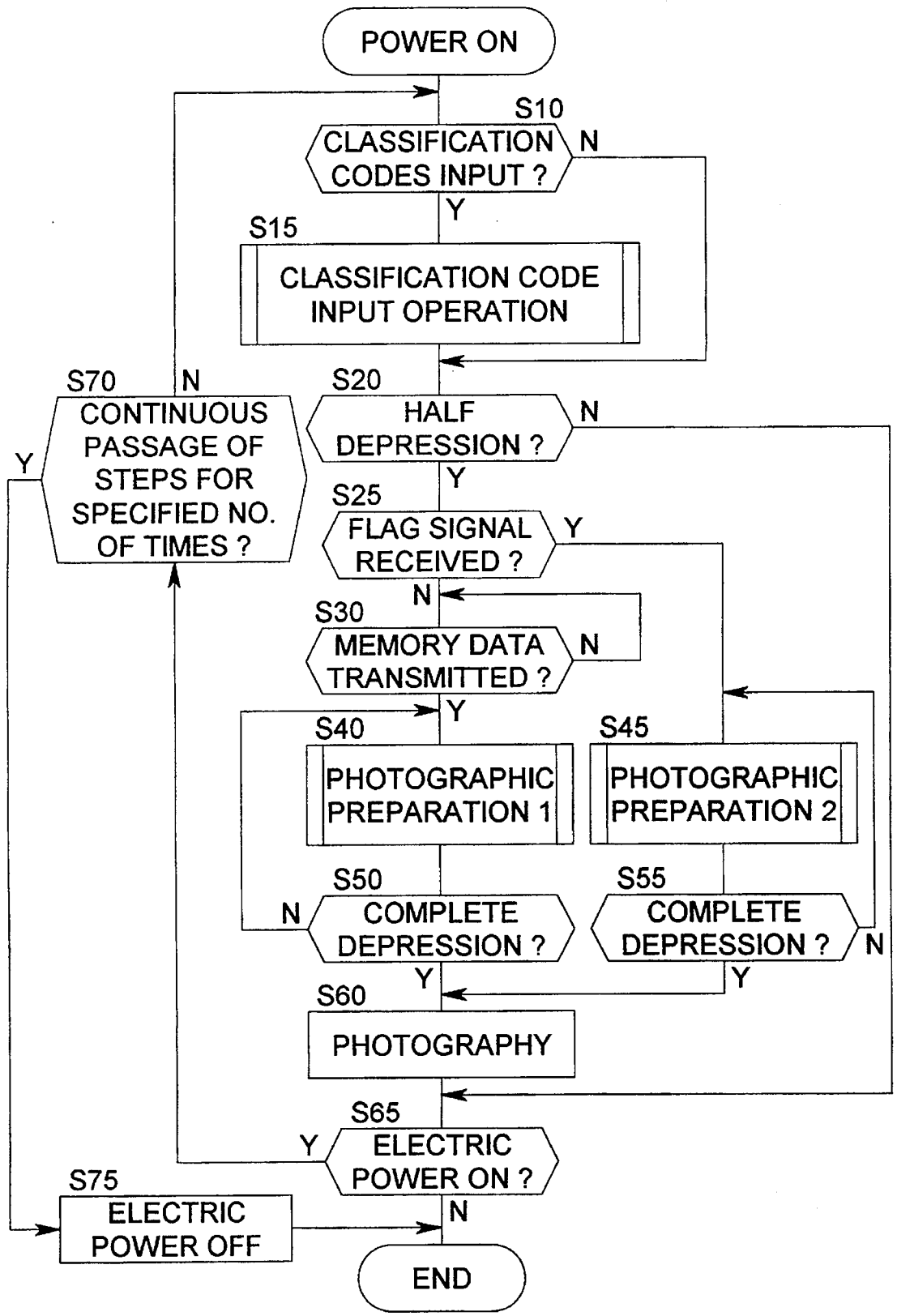
FIG. 4 is a flowchart that shows the sequential operation of the main functions of a camera according to the present invention.

FIG. 4 is a flowchart of a main program stored in the camera body CPU 26, which starts when the electric power switch 27c is turned on. In step S10, a determination is made as to whether the operation for inputting the camera body classification code is being performed. If so, then in step S15 the classification code input operation is executed. The determination of the input classification code is accomplished on the basis of whether there has been a specified key input from the input device 50, which is detachably connected to the camera body. Such input also may be accomplished from a dial or a data back switch permanently provided on the camera body.

Figure 5:
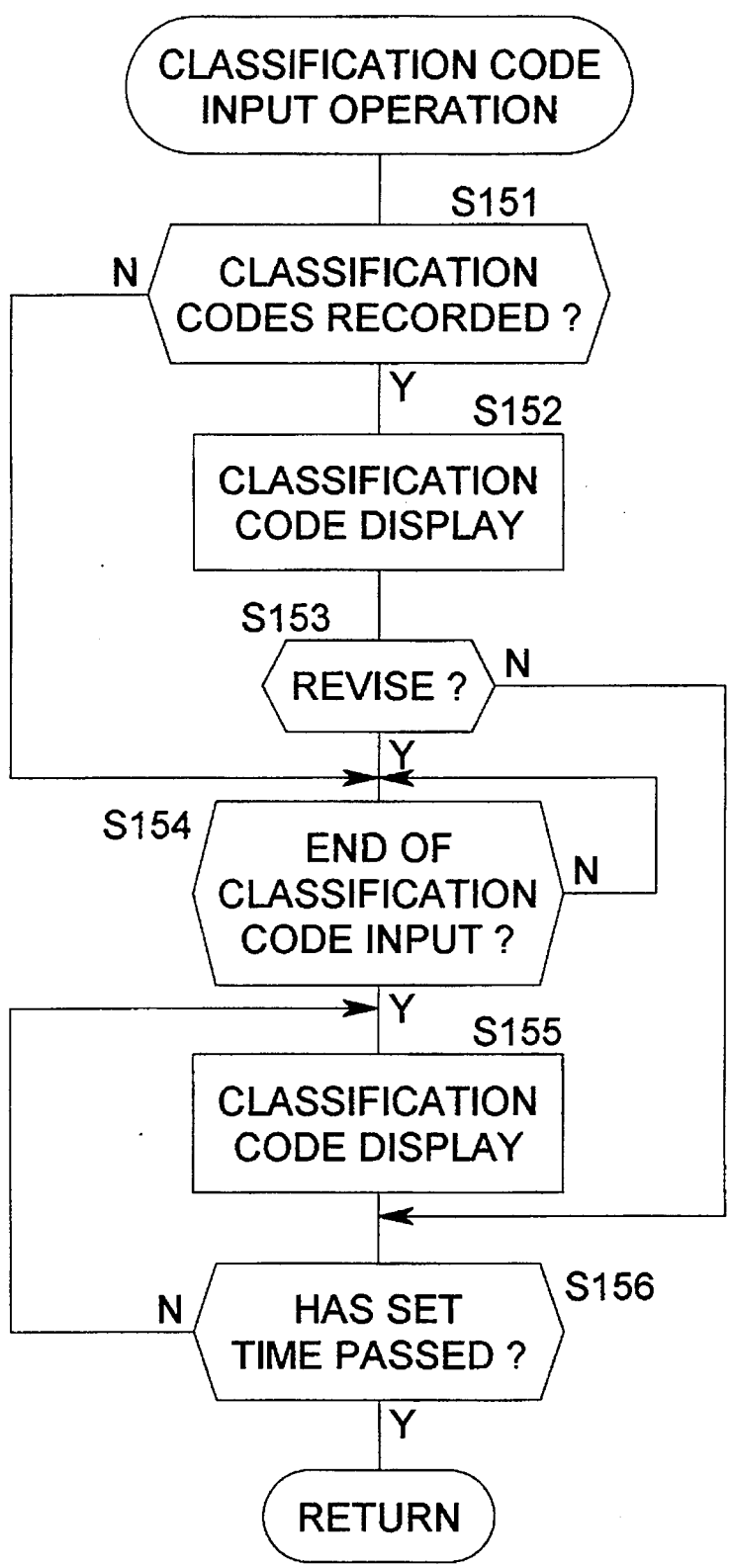
FIG. 5 is a flowchart that shows the classification code input operation performed on the camera body side according to an embodiment of the present invention.

An explanation of the classification code input operation is provided in FIG. 5. FIG. 5 is a flowchart that explains the input of the classification code into the camera body, which is stored in memory 26a of the camera body CPU 26.

In step S151, the memory 26a used to store the classification code of the camera body CA is accessed, and a determination is made as to whether a classification code already has been recorded therein. If so, then in step S152, the classification code recorded in the camera body is displayed using the liquid crystal display 51, and in step S153, a determination is made as to whether the classification code already established needs to be revised. This need or lack thereof is confirmed in the liquid crystal display 51. For example, using display 51, the camera can prompt the operator as to whether a change is required or desired. The need to change the classification code can be input by, for example, a half depression of the release button, and a confirmation of various classification code formats, for example.

If there is no need for a revision, the program proceeds to step S156, and if a time specified by the classification code indication is exceeded, then the program is terminated. If step S151 is negative, or if step S153 is positive, then the program proceeds to step S154, where a determination is made as to whether the operation for the input of a classification code from the input device 50 is completed. Upon completion of the classification code input operation, the program proceeds to step S155, where the classification code is displayed on display 51 until the predetermined time set in step S156 is elapsed. Upon completion of the operation shown in FIG. 5 the program proceeds to step S20 shown in FIG. 4.

In step S20 shown in FIG. 4, a determination is made as to whether the half depression switch 27a is "on". If so, then the program proceeds to step S25. If there is no half depression of the switch, then the program proceeds to step S65. In step S25, a determination is made as to whether a flag signal, explained hereafter, indicating that there is no calibration data has been received. If not, i.e., if calibration data exists, then the program proceeds to step S30, where a determination is made as to whether the calibration data has been transmitted from the viewfinder. If so, then in step S40 a first photography preparation operation is executed. In step S25, if it is determined that the flag signal has been received, i.e., if no calibration data exists, then the program proceeds to step S45, where a second photographic preparation operation is executed.

Figure 6:
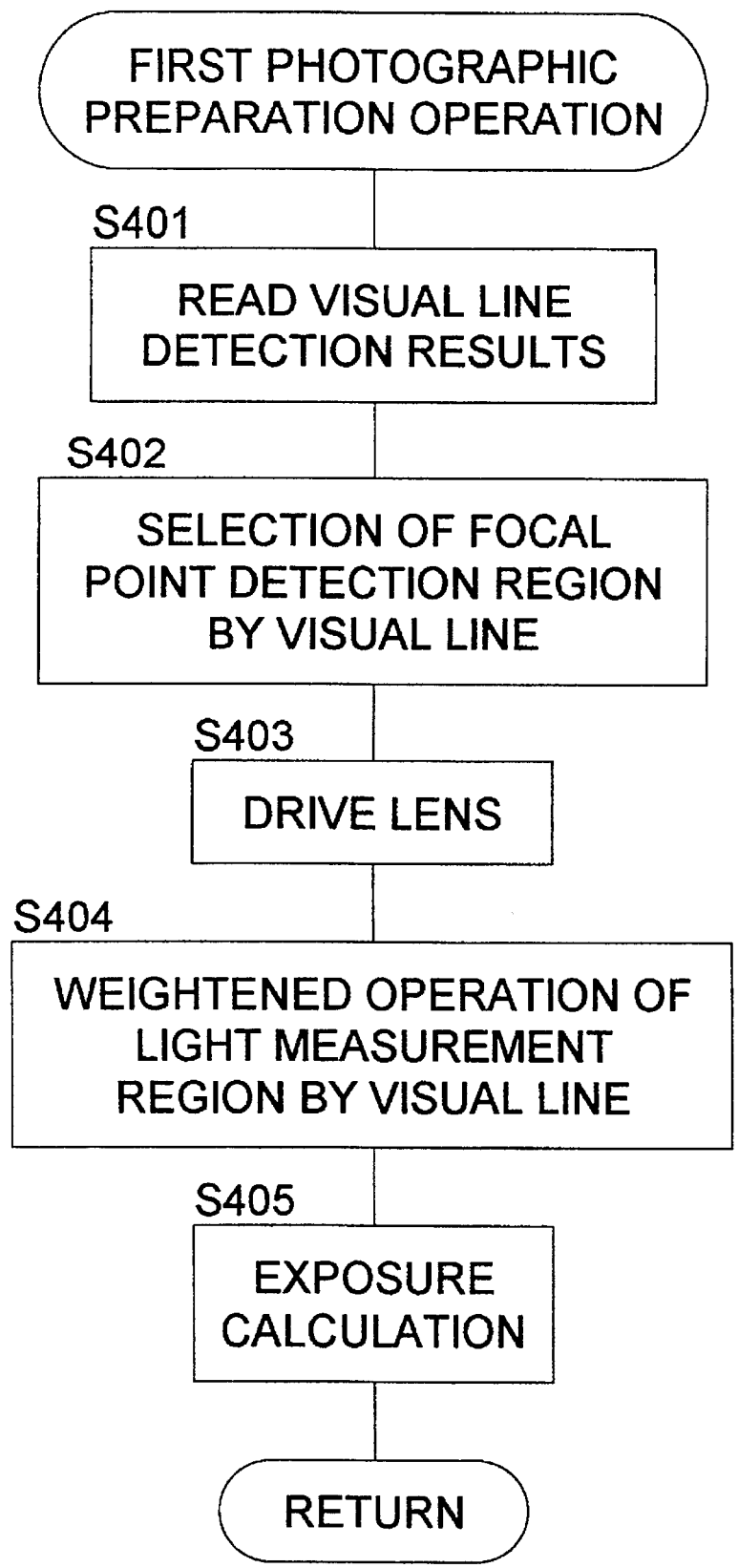
FIG. 6 is a flowchart that shows a first photographic preparation operation performed on the camera body side according to an embodiment of the present invention.
Figure 7:
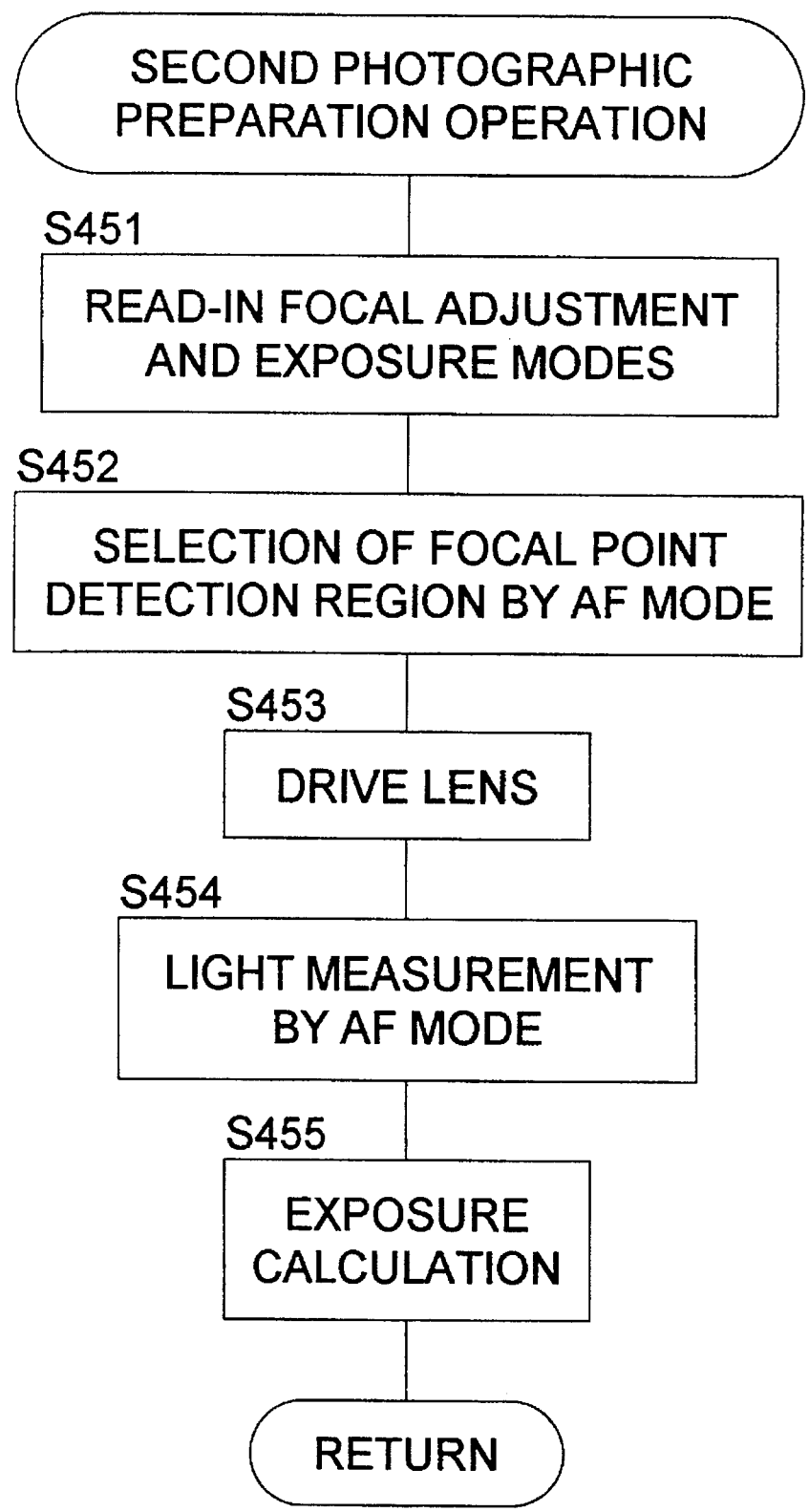
FIG. 7 is a flowchart that shows a second photographic preparation operation performed on the camera body side according to an embodiment of the present invention.

FIGS. 6 and 7 depict the first and second photographic preparation operations. The first operation uses the visual line detection technique to perform photography based upon a detection of the region on which the photographer is focusing. The second operation uses photographer-manually selected settings to perform photography.

FIG. 6 is a flowchart showing the first photographic preparation operation. In step S401, values are taken that relate to the visual line calculated by the viewfinder CPU 39. In step S402, a selection is made of the focal point detection region based upon the values relating to the obtained visual line, and calculations are made for the adjustment of the focal point. In step S403, the photographic lens is driven to the composite focal position where the photographic image is in focus condition. For example, the photographic lens is driven on the basis of the focal point detection results for the region through which the visual line passes. Furthermore, in step S404, on the basis of the values relating to the obtained visual line, an amount of the weight applying to each of divisional light measurement signals is determined. For example, with respect to the light measurement accumulation signals from the region through which the visual line passes, an amount of the weight becomes large, and with respect to the light measurement signals from the other regions, an amount of the weight becomes small. In step S405, light exposure calculation is accomplished on the basis of the weighted signals. The program returns to step S50 of FIG. 4 once the exposure values are calculated.

When no calibration data is recorded in the memory 39a of the viewfinder, then the second photographic preparation operation shown in FIG. 7 is executed. In step S451, the focal adjustment mode and the light measurement mode established by photographer operation of the mode selection component 53 are read in. In step S452, the focal detection region is selected on the basis of the established focal adjustment mode, and calculations are accomplished for the purpose of focal adjustment. In step S453, the photographic lens is driven to the position where a photographic image is in focus condition. For example, focal adjustment is executed with the focal detection mode in a wide focal detection region, or with the focal detection mode in a central, narrow region, according to the selection of the photographer. In step S454, light measurement is accomplished in the established light measurement mode, for example, in a multi-pattern light measurement mode, or in a center-weighted point light measurement mode. In step S455, on the basis of the established mode, exposure value calculations are accomplished. Once the exposure value calculations have been made, the program returns to step S55 in FIG. 4.

If in step S50 or step S55 of FIG. 4 a determination is made that the complete depression switch 27b is 'on', the program proceeds to step S60, and after the accomplishment of photography under the photographic conditions established in step S40 or in step S45, the next photographic action is taken. Namely, with a camera using a silver halide film, there is an advancement of the film by one frame. Next, continuing to step S65, a determination is made as to whether the electric power switch 27c is 'on'. If so, then the program proceeds to step S70. In step S70, a determination is made as to whether the program has passed continuously through these steps a specified number of times. If so, then in step S75, after the electric power has been turned off, the series of routines is completed. However, then the program returns to step S10 until the specified number of repetitions has been completed, and the steps S10–step S65 are repetitively executed. In step S65, if the power switch 27c is determined to be "off", then the program is terminated.

Figure 8:
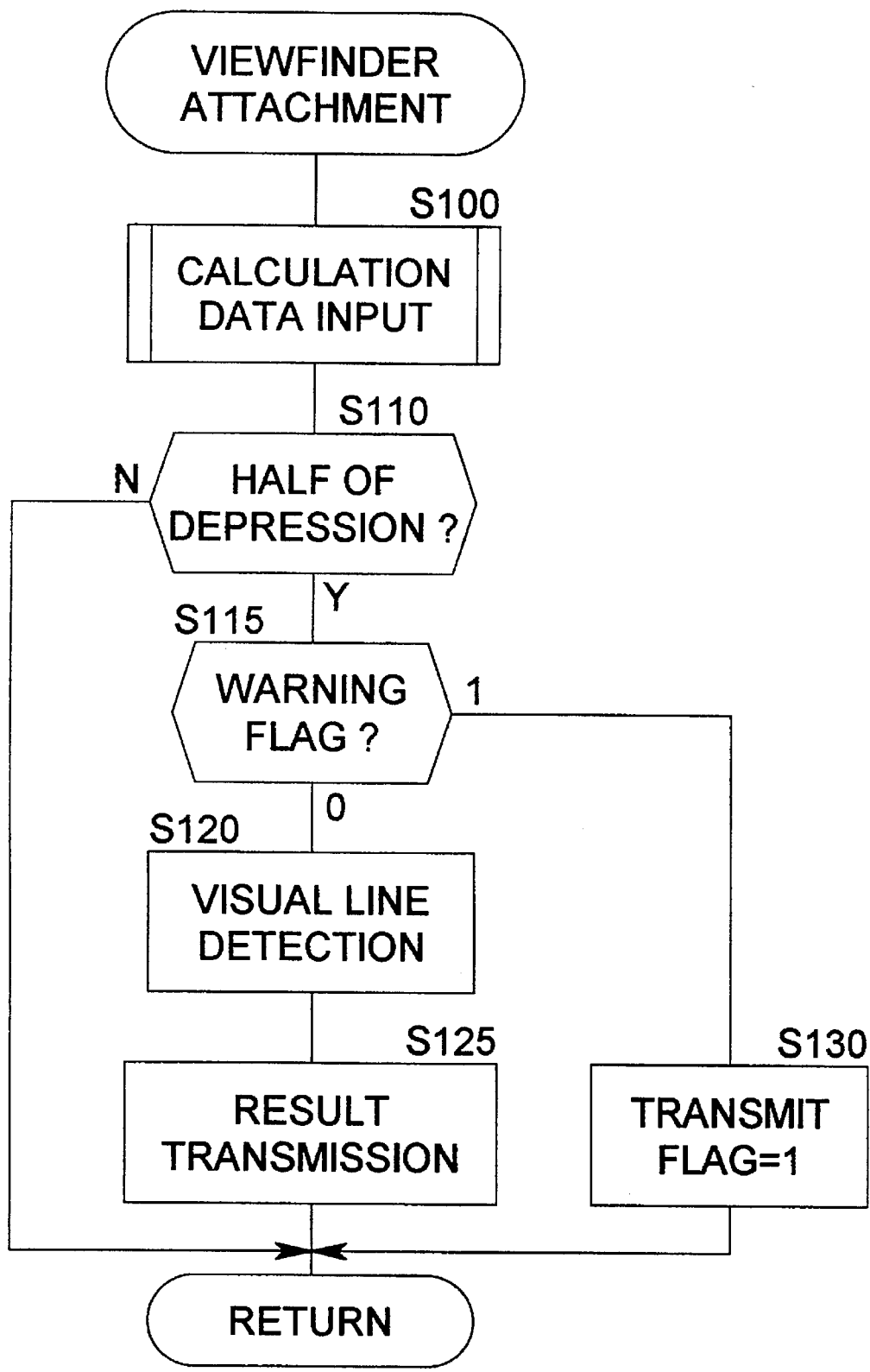
FIG. 8 is a flowchart that shows the main operation performed on the viewfinder side according to an embodiment of the present invention.
Figure 9:
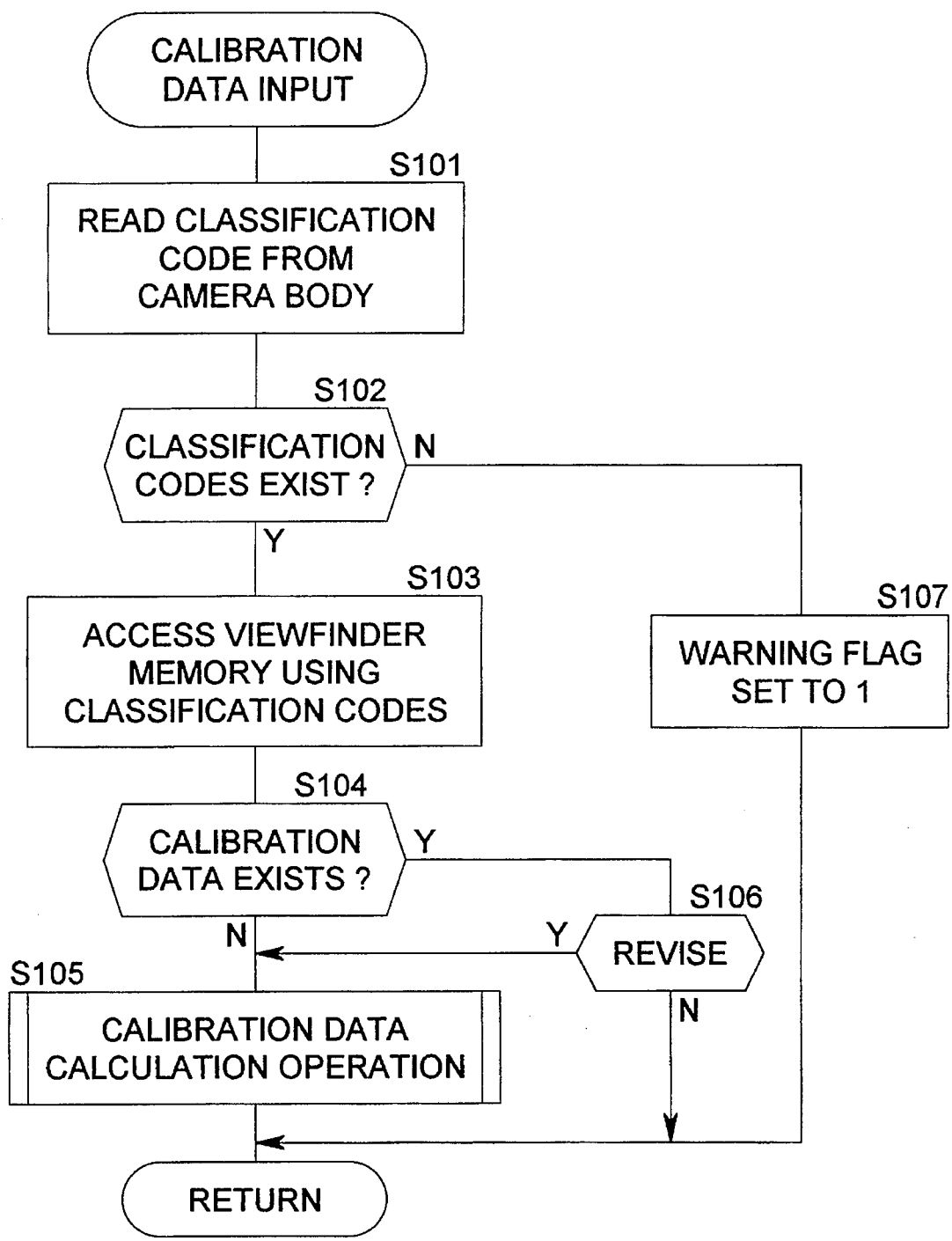
FIG. 9 is a flowchart that shows the calibration data calculation operation performed on the viewfinder side according to an embodiment of the present invention.

FIG. 8 is a program provided in the viewfinder CPU 39, and which is initially run when the viewfinder is attached to the camera body. When the program is run, then initially, in step S100, the input of calibration data is accomplished. FIG. 9 serves to explain the calibration data input operation program.

In step S101, the classification code is read in from the camera body, and in step 102, a determination is made as to whether the classification code is present, that is, a determination is made as to whether any classification code was stored in the camera body memory 26a. If the classification code is not present, then in step S107 the warning flag is set to a value of "1" along with issuing a warning and the FIG. 9 operation is terminated. With reference to FIG. 4, when the warning flag is set to "1", step S25 leads to step S45; if the warning flag is not set to "1" step S30 results. If a classification code is present, then in step S103 the viewfinder memory 39a is accessed and a calibration data is read out in accordance with classification codes. In step S104, if a determination is made that calibration data (correction values) are present for the read-in classification code, then in step S106 a determination is made as to whether there is a need to revise the calibration data. If a revision is deemed to be unnecessary, step S106 is negated and then the FIG. 9 operation is terminated. The need for a revision or lack thereof is confirmed via the liquid crystal display 51. If there is a need, then through the half depression of the release button, the revision or lack thereof of the calibration data can be confirmed. If there is no calibration data, or a need to provide new data, then in step S105 calibration data calculation can be executed, and new calibration data can be recorded.

Figure 10:
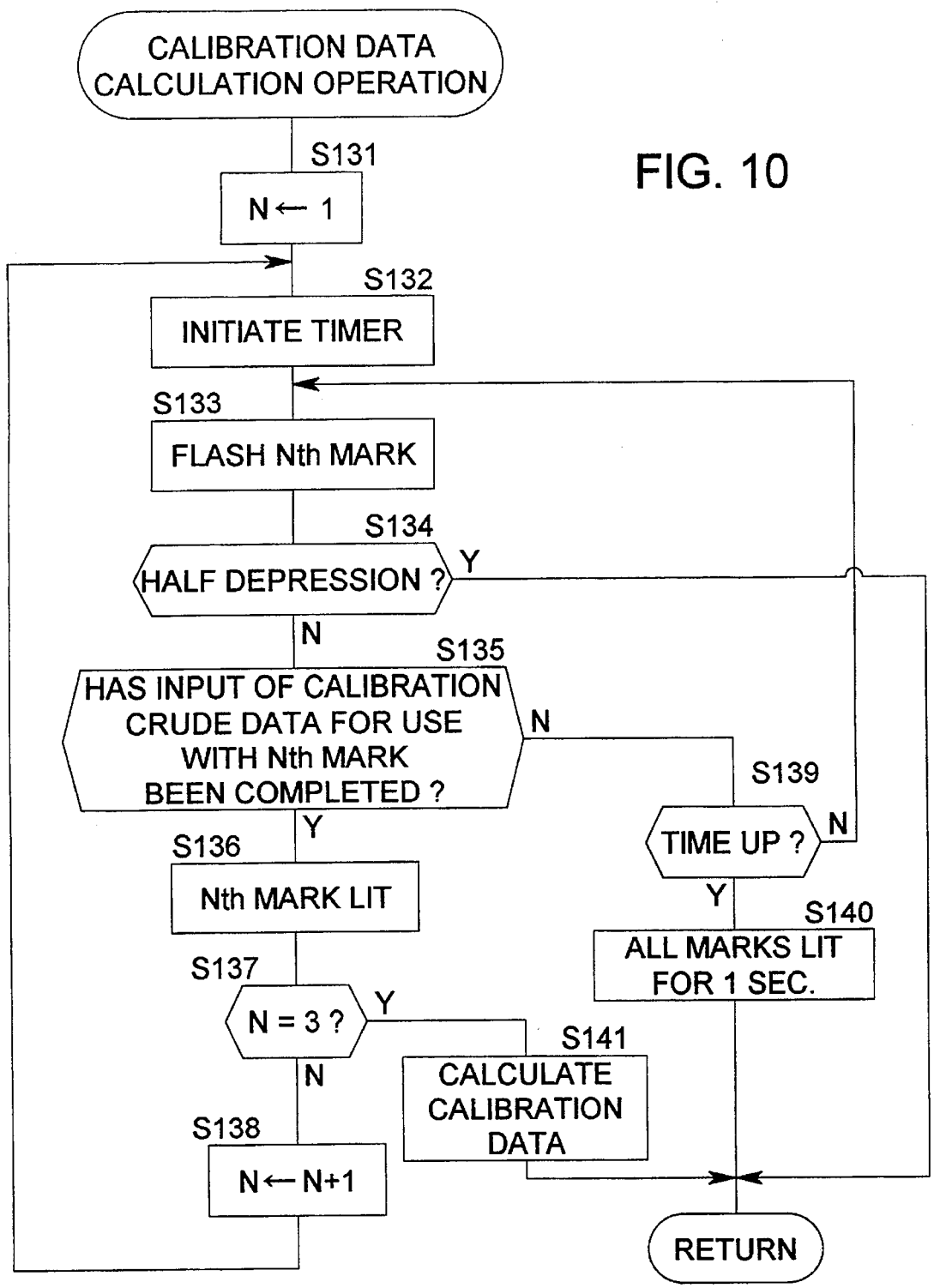
FIG. 10 is a flowchart that shows the calibration data calculation operation according to an embodiment of the present invention.

FIG. 10 is a flow chart that explains the calibration data calculation operation program.

If the program shown in FIG. 10 is started, then in step S131, "1" is assigned to the variable N, and the timer count commences in step S132. In step S133, the Nth mark $M_N$ produced by the light emitting diode $52_N$ is caused to flash on and off. Proceeding to step S134, a determination is made as to whether the half depression switch 27b is 'on'. If so, the program returns to step S110 shown in FIG. 8.

If the half-depression switch 27b is determined to be 'off' then the program proceeds to step S135, and a determination is made as to whether the input of the crude calibration data used to detect the visual line by means of the Nth mark $M_N$ has been completed. As detailed in the above-identified U.S. patent application Ser. No. 08/005,829, the crude calibration data is input by using the eyeball illuminating LED 35 and the visual line photoelectric converter 38 to measure the visual axis of the photographer when the photographer is focusing on one of the target reference marks M1–M3 (i.e., diodes $52_1$–$52_3$). Thus, in the disclosed embodiment, when Nth mark $M_N$ is flashing, the photographer focuses on that mark, and the visual axis of the photographer is measured by visual line photoelectric converter 38. Since the locations of the target reference marks are known, the measured visual axis can be used to calibrate the visual line detecting device. If in step S135 the input of the crude calibration data is completed, then in step S136 the Nth mark $M_N$ is lit for one second, for example, communicating the termination of the input of the crude calibration data for that mark.

In step S137, a determination is made as to whether the input of the crude calibration data used for detecting the visual line has been completed for all of the marks. If so, the program proceeds to step S141, where the calibration data is calculated on the basis of the crude calibration data. Subsequently, upon completion of the calibration data calculation operation, the program returns to step S110 shown in FIG. 8. In step S137, if it is determined that the input of the crude calibration data for all of the marks not been completed, the program proceeds to step S138.

In step S138 the value of the variable N is incremented by one. Then, the program proceeds to step S132, and the same operations are executed.

If it is determined in step S135 that the input of the crude calibration data used for visual line detection according to the Nth mark has not been completed, then the program proceeds to step S139, where a determination is made as to whether the timer count has reached a specified value, i.e. whether the time is up. If the time is not up, then there is a return to step S133. If the time is up, then the program proceeds to step S140, and all of the marks M1–M3 flash for one second. Thus, an error is reported in the input of the crude calibration data used for visual line detection, and the program returns to step S110 shown in FIG. 8.

In the preferred embodiment, a crude calibration data is comprised of rotational angles 74 1–θ3 of the visual angle obtained from the optical axis of the viewfinder when the observed marks M1–M3 shown in FIG. 3 are respectively viewed, and the distances d1–d3 between the primary Purkinje image from the center of the cornea.

In other words, each of the crude calibration data A1–A3 for each of the marks M1–M3 is represented as follows:

A1=(θ1, d1)

A2=(θ2, d2)

A3=(θ3, d3)

In addition, the calibration data k and d can be calculated in the following manner, through the utilization of the crude calibration data A1–A3:

k=(k1+k2)/2 d=(d1+d2)/2

Here, k1=(d1–d2)/(θ1–θ2)

k2=(d2–d3)/(θ2–θ3)

d1=(d2θ1–d1θ2)/(θ1–θ2)

d2=(d3θ2–d2θ3)/(θ2–θ3)

In FIG. 8, if step S110 is yes, the program proceeds to step S115 in which a determination is made as to whether the warning flag is "0". If so, the visual line detection is performed in step S120 on the basis of the visual axis of the eyeball of the photographer detected when the photographer views the object to be photographed and the calibration data. Then the results thereof is transmitted to the camera body CPU 26. If step S115 is judged to be "1", the program proceeds to step S130 in which the warning flag being "1" is transmitted to the camera body.

With the present embodiment, when a viewfinder is attached to a single lens reflex camera, accessed is the memory 39a within the viewfinder in which the calibration data is stored in correspondence with classification codes which have been pre-established in a camera body, so that the specific calibration data for a particular camera operator can be read-out, and the visual line of the camera operator can be calculated on the basis of the calibration data and the visual line detection results. Since the calibration data for a viewfinder used by a specific photographer is stored, it becomes unnecessary to re-configure the calibration data each time the viewfinder is used again with the same camera body, thereby improving the overall camera operation. In addition, by assigning classification codes to specific camera bodies, when the viewfinder is attached, the appropriate calibration data is automatically read-in based upon the classification code of the camera for subsequent calculation of the visual line. Accordingly, when the viewfinder is used with multiple persons, use of the viewfinder can be simply coordinated.

In accordance with the embodiment of the present invention detailed above, since the correction values are stored within the viewfinder, the establishment of revised values becomes unnecessary every time the interchangeable viewfinder is changed. This results in an improvement in the operation of the camera. In addition, if the values for various photographers are pre-stored in the viewfinder in correspondence with (i.e., associated with) a classification code specific to each photographer's camera body, when the viewfinder is attached to one photographer's camera body, since the desired correction values can be read out on the basis of the classification code in that camera body, even when the viewfinder is used by many individuals, accurate utilization can be made of specific correction values for many individuals.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

I claim:

1. A camera having a camera body and a visual line detection device, said camera comprising:

a viewfinder that is detachable from the camera body;

a detection device that detects a visual axis of an eyeball of a photographer viewing an object through the viewfinder;

a correction value calculator that calculates a correction value based upon differences between the visual axis detected by the detection device when the photographer views a reference target mark and an actual viewing direction toward the reference target mark;

a correction value storage device located in said viewfinder that stores the correction value calculated by said correction value calculator;

a visual line calculator that calculates a value relative to the visual line of the photographer on the basis of the detected visual axis when the photographer views an object and on the basis of the correction value stored in said correction value storage device;

a classification code storage device that stores a classification code for the camera body, said classification code being distinctive for said camera body, and being provided in said camera body; and a read-out circuit that reads the correction value out from said correction value storage device by reading the classification code stored in the classification code storage device and accessing the correction value storage device based on the classification code stored in the classification code storage device.

2. The camera of claim 1, further comprising:

an establishment device that establishes photographic conditions based upon the calculated value related to the visual line of the photographer; and a photographic device that executes a photographic operation in response to a release operation.

3. The camera of claim 2, further comprising:

a determination circuit that determines whether the classification code exists in said classification code storage device, and a photographic condition establishment control circuit that controls the establishment device so as to establish said photographic conditions in accordance with photographic settings selected by the photographer when said determination circuit determines that there is no classification code stored in said classification code storage device, and without using the value relative to the visual line of the photographer calculated by said visual line calculator.

4. The camera of claim 1, wherein said detection device, said correction value calculator, and said visual line calculator are provided in said viewfinder.

5. A camera having a camera body and a visual line detection device, said camera comprising:

a viewfinder that is detachable from the camera body;

a detection device, located in said viewfinder, that detects a visual axis of an eyeball of a photographer viewing an object through the viewfinder;

a correction value calculator, located in said viewfinder, that calculates a correction value based upon differences between the visual axis detected by the detection device when the photographer views a reference target mark and an actual viewing direction toward the reference target mark;

a correction value storage device located in said viewfinder that stores the correction value calculated by said correction value calculator;

a visual line calculator, located in said viewfinder, that calculates a value relative to the visual line of the photographer on the basis of the detected visual axis when the photographer views an object and on the basis of the correction value stored in said correction value storage device;

an establishment device, located in said camera body, that establishes photographic conditions based upon the calculated value related to the visual line of the photographer;

a photographic device, located in said camera body, that executes a photographic operation in response to a release operation;

a transmission device coupled between said viewfinder and said camera body, and transmitting data between said viewfinder and said camera body;

a classification code storage device that stores a classification code for the camera body, said classification code being distinctive for said camera body, and being provided in said camera body; and a read-out circuit that reads the correction value out from said correction value storage device by reading the classification code stored in the classification code storage device and accessing the correction value storage device based on the classification code stored in the classification code storage device.

6. The camera of claim 5, wherein during photography, the transmission device transmits the calculated value relating to the visual line of the photographer calculated by the visual line calculator from said viewfinder to said camera body.

7. The camera of claim 5, wherein said read-out circuit is provided in said viewfinder, and wherein said transmission device transmits the classification code to the viewfinder when said viewfinder is attached to the camera body, and said read-out circuit reads the correction value when said viewfinder is attached to the camera body and transmits said correction value to the visual line calculator.

8. A camera having a camera body and a visual line detection device, said camera comprising:

a viewfinder that is detachable from the camera body;

a detection device that detects a visual axis of an eyeball of a photographer viewing an object through the viewfinder;

a correction value calculator that calculates a correction value based upon differences between the visual axis detected by the detection device when the photographer views a reference target mark and an actual viewing direction toward the reference target mark;

a correction value storage device located in said viewfinder that stores plural sets of correction values calculated by said correction value calculator, each set being stored in correspondence with a classification code that is specific to a particular camera body; and a visual line calculator that calculates a value relative to the visual line of the photographer on the basis of the detected visual axis when the photographer views an object and on the basis of the correction value stored in said correction value storage device.

9. A detachable viewfinder having a visual line detection device, said detachable viewfinder comprising:

a detection device that detects a visual axis of an eyeball of a photographer viewing an object through an eyepiece of the viewfinder;

a correction value calculator that calculates a correction value based upon differences between the visual axis detected by the detection device when the photographer views a reference target mark and an actual viewing direction of the photographer toward the reference target mark;

a correction value storage device that stores plural sets of correction values calculated by said correction value calculator, each set being stored in correspondence with a classification code that is specific to a particular camera body; and a visual line calculator that calculates a value relative to the visual line of the photographer on the basis of the detected visual axis when the photographer views an object and on the basis of the correction value stored in said correction value storage device.

10. The detachable viewfinder of claim 9, wherein said detection device includes a photoelectric conversion device.

11. The detachable viewfinder of claim 9, wherein at least one light emitting element is provided in the viewfinder to display said reference target mark.

12. The detachable viewfinder of claim 9, wherein said correction value calculator and said visual line calculator include a programmed processor.

13. The detachable viewfinder of claim 12, wherein said correction value storage device is an EEPROM.

14. The detachable viewfinder of claim 13, wherein said EEPROM is part of said processor.

15. A camera having a camera body and a visual line detection device, said camera comprising:

a viewfinder that is detachable from the camera body;

detection means for detecting a visual axis of an eyeball of a photographer viewing an object through the viewfinder;

correction value calculation means for calculating a correction value based upon differences between the visual axis detected by the detection means when the photographer views a reference target mark and an actual viewing direction of the photographer toward the reference target mark;

correction value storage device, located in said viewfinder, for storing the correction value calculated by said correction value calculation means;

visual line calculation means for calculating a value relative to the visual line of the photographer on the basis of the detected visual axis when the photographer views an object and on the basis of the correction value stored in said correction value storage device;

classification code storage device for storing a classification code for the camera body, said classification code being distinctive for said camera body, and being provided in said camera body; and read-out means for reading the correction value out from said correction value storage device by reading the classification code stored in the classification code storage device and accessing the correction value storage device based on the classification code stored in the classification code storage device.

16. The camera of claim 15, further comprising:

establishment means for establishing photographic conditions based upon the calculated value related to the visual line of the photographer; and photographic means for executing a photographic operation in response to a release operation.

17. The camera of claim 13, further comprising:

determination means for determining whether the classification code exists in said classification code storage device, and photographic condition establishment control means for controlling the establishment means so as to establish said photographic conditions in accordance with photographic settings selected by the photographer when said determination means determines that there is no classification code stored in said classification code storage device, and without using the value relative to the visual line of the photographer calculated by said visual line calculation means.

18. The camera of claim 15, wherein said detection means, said correction value calculation means, and said visual line calculation means are provided in said viewfinder.

19. A camera having a camera body and a visual line detection device, said camera comprising:

a viewfinder that is detachable from the camera body;

detection means, located in said viewfinder, for detecting a visual axis of an eyeball of a photographer viewing an object through the viewfinder;

correction value calculation means, located in said viewfinder, for calculating a correction value based upon differences between the visual axis detected by the detection means when the photographer views a reference target mark and an actual viewing direction of the photographer toward the reference target mark;

correction value storage device, located in said viewfinder, for storing the correction value calculated by said correction value calculation means;

visual line calculation means, located in said viewfinder, for calculating a value relative to the visual line of the photographer on the basis of the detected visual axis when the photographer views an object and on the basis of the correction value stored in said correction value storage device;

establishment means, located in said camera body, for establishing photographic conditions based upon the calculated value related to the visual line of the photographer;

photographic means, located in said camera body, for executing a photographic operation in response to a release operation;

transmission means, coupled between said viewfinder and said camera body, for transmitting data between said viewfinder and said camera body;

classification code storage device for storing a classification code for the camera body, said classification code being distinctive for said camera body, and being provided in said camera body; and read-out means for reading the correction value out from said correction value storage device by reading the classification code stored in the classification code storage device and accessing the correction value storage device based on the classification code stored in the classification code storage device.

20. The camera of claim 15, wherein during photography, the transmission means transmits the calculated value relating to the visual line of the photographer calculated by the visual line calculation means from said viewfinder to said camera body.

21. The camera of claim 19, wherein said read-out means is provided in said viewfinder, and wherein said transmission means transmits the classification code to the viewfinder when said viewfinder is attached to the camera body, and said read-out means reads the correction value when said viewfinder is attached to the camera body and transmits said correction value to the visual line calculation means.

22. A camera having a camera body and a visual line detection device, said camera comprising:

a viewfinder that is detachable from the camera body;

detection means for detecting a visual axis of an eyeball of a photographer viewing an object through the viewfinder;

correction value calculation means for calculating a correction value based upon differences between the visual axis detected by the detection means when the photographer views a reference target mark and an actual viewing direction of the photographer toward the reference target mark;

correction value storage device, located in said viewfinder, for storing plural sets of correction values calculated by said correction value calculation means, each set being stored in correspondence with a classification code that is specific to a particular camera body; and visual line calculation means for calculating a value relative to the visual line of the photographer on the basis of the detected visual axis when the photographer views an object and on the basis of the correction value stored in said correction value storage device.

23. A method of using a camera having a visual line detection device and a viewfinder that is detachable from a camera body, said method comprising:

determining correction values for use in calculating a value relative to a visual line of a photographer on the basis of a detected visual axis when the photographer views an object through the viewfinder; and storing plural sets of said correction values in a correction value storage device in said viewfinder, each set being stored in correspondence with a classification code that is specific to a particular camera body.

24. The method of claim 23, wherein said correction values are determined by:

detecting a visual axis of an eyeball of the photographer viewing a reference target mark through the viewfinder;

calculating said correction values based upon differences between the detected visual axis and an actual viewing direction of the photographer toward the reference target mark.

25. The method of claim 15, the visual axis of the eyeball is detected for plural reference target marks.

26. A method of using a camera having a visual line detection device and a viewfinder that is detachable from a camera body, said method comprising:

determining correction values for use in calculating a value relative to a visual line of a photographer on the basis of a detected visual axis when the photographer views an object through the viewfinder;

storing said correction values in correspondence with a classification code that is specific to a particular camera body, in a correction value storage device in said viewfinder;

reading a classification code from a classification code storage device in said camera body; and accessing the correction values that are stored in correspondence with the read-out classification code in said correction value storage device.

27. The method of claim 13, further comprising:

detecting a visual axis of an eyeball of the photographer viewing an object through the viewfinder;

calculating a value relative to a visual line of a photographer on the basis of the detected visual axis of the photographer viewing the object through the viewfinder and the correction values;

establishing photographic conditions based upon the calculated value related to the visual line of the photographer; and executing a photographic operation in response to a release operation.

28. The method of claim 26, further comprising:

determining whether the classification code exists in said classification code storage device in said camera body; and establishing photographic conditions in accordance with photographic settings selected by the photographer when it is determined that no classification code is stored in said classification code storage device.

* * * * *